Feb. 17, 1942. R. BENNETT 2,273,171
REMOTE CONTROL APPARATUS
Filed Nov. 16, 1939 3 Sheets-Sheet 3

Inventor,
ROLAND BENNETT,
By Blair & Keeope
Attys.

Patented Feb. 17, 1942

2,273,171

UNITED STATES PATENT OFFICE 2,273,171

REMOTE CONTROL APPARATUS

Roland Bennett, London, England

Application November 16, 1939, Serial No. 304,842
In Great Britain November 30, 1938

8 Claims. (Cl. 121—41)

This invention relates to the transmission of controlled motion to apparatus at a distance by means of a column of fluid, and according to the invention the pressure at one end of the column of fluid is balanced both by pressure admitted between opposed pistons of unequal areas in a pressure reducing valve and by additional loading means, so that the remote apparatus may be controlled by varying the load due to the said additional means, thereby altering the pressure of the column of fluid. The arrangement may therefore be such that, when the load due to the additional loading means in increased, the valve is moved to admit fluid past one of the pistons from the space between the two pistons to increase the pressure of the fluid column but that, when the additional loading means is relaxed, the pressure of the fluid column is reduced as the result of escape of fluid until a new condition of equilibrium is reached. This escape may take place through a small orifice located at any convenient point between the valve and the remote apparatus and this orifice may be arranged so that it remains open throughout the operation of the apparatus, the arrangement then being such that the continuous tendency for the pressure in the fluid column to decrease is automatically made up by the delivery of further fluid past the aforesaid one of the pistons of the valve. Alternatively, the port may be closed automatically each time the valve is operated to admit further fluid under pressure to the fluid column interposed between the valve and the remote apparatus.

The remote apparatus may comprise a piston and cylinder in communication with the fluid column. If the piston is to be single-acting it may be loaded by a spring on the side thereof remote from the fluid, the stress in the spring varying directly as the position of the piston and as the pressure in the fluid column so that the piston takes up a definite position for every pressure within a predetermined range of pressures. If, on the other hand, the piston is to be double-acting, two controlling devices may be connected respectively through two separate fluid columns to the ends of the cylinder, a spring being arranged to act on each side of the piston. Then, if the valves in the controlling devices are operated differentially, corresponding movements of the piston will occur. The use of this differential system ensures positive action in both directions and can very usefully be employed for the control of ships' steering gear or gyroscopic mechanism.

It will be appreciated further that a number of controlling devices may be grouped together in a very small compass working a corresponding number of devices at distant points, while using only one source of constant fluid pressure. When compressed air is used as the fluid, light alloy tubes and valves may be employed so as to provide a very light form of remote control system.

In order that the invention may be clearly understood and readily carried into effect, apparatus in accordance therewith will now be described, by way of example, with reference to the accompanying drawings, in which—

Figure 4 is an elevation, partly in section, of part of a third form of remote control apparatus.

Figure 1:
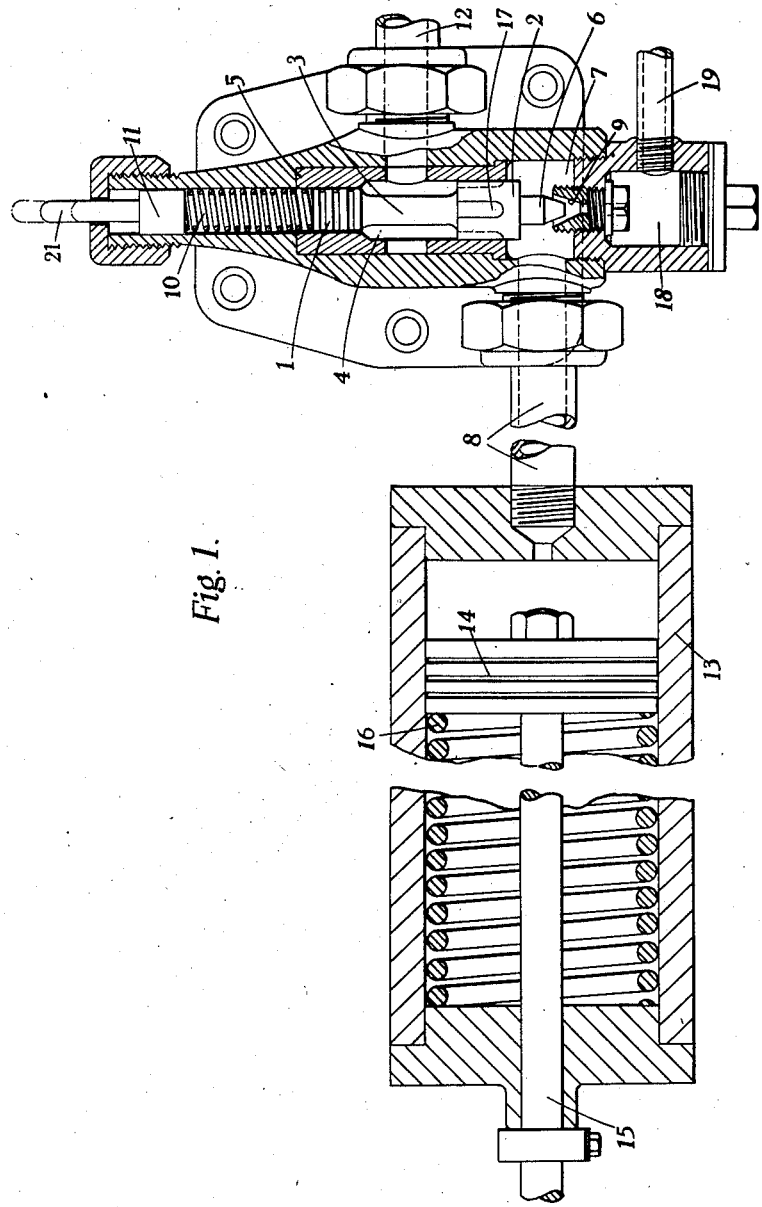
Figure 1 is an elevation, partly in section, of one form of remote control apparatus.

At the controlling end of the apparatus in Figure 1 there is a reducing valve having a piston member comprising pistons 1 and 2 connected co-axially by a rod 3. This member slides in a vertical cylinder 4 which is reduced in diameter at its upper end 5 to accommodate the upper piston 1, which is of smaller diameter than the lower one 2. From the centre of the latter a stem 6 extends downwards through a space 7 open to a pipe 8 leading to the distant apparatus, which is to be controlled through the medium of the reducing valve. The stem 6 is formed with a conical end for co-operation with a conical bleeder port 9.

A helical spring 10 is interposed between the piston 1 and an adjustable abutment 11. Fluid under pressure is admitted to the space between the pistons 1 and 2 through a pipe 12 connected to a source of fluid under constant pressure such as a gravity tank or a constant pressure pump. When the system is in equilibrium the pressure beneath the lower piston 2 plus the pressure beneath the upper piston 1 balances the pressure above the lower piston 2 plus the pressure due to the spring 10 acting on the upper piston. In this equilibrium condition fluid continually leaks through the bleeder port 9 while the fluid column in the pipe 8 and space 7 is replenished by fluid passing from the space 3 between the two pistons through grooves 17 in the piston 2.

The remote end of the pipe 8 is connected to one end of a cylinder 13 within which there is a reciprocable piston 14 carried by a piston rod 15 connected to the apparatus to be controlled. A spring 16 acts on the side of the piston 14 remote from the pipe 8 and, of course, when the system is in equilibrium the spring 16 exactly balances the fluid pressure on the piston 14. When it is desired to move the piston rod 15 in such a direction that the spring 16 is compressed, the abutment 11 is moved downwards. The immediate effect of this is to move the piston 1, 2 downwards through the medium of the spring 10. The result of this is that the bleeder port 9 is closed by the conical end of the stem 6 while the grooves 17 are uncovered to a greater extent so that the volume of fluid between the piston 2 and the piston 14 is increased while the piston 14 compresses the spring 16 and the pressure in the pipe 8 increases, the fluid pressure above the lower piston 2 being greater than that beneath it. It will be appreciated that it is in order that this difference in pressure may exist that the opposed pistons 1 and 2 are employed. Furthermore, due to the difference of the areas of the pistons 1 and 2 there is an effective pressure area on top of the piston 2 on which area the pressure of the supply fluid acts and thereby causes a force in opposition to the force caused by the pressure on the bottom of piston 2. This opposing force permits an actuating force on the abutment 11 and spring 10, for a given pressure in the cylinder 13, smaller than is necessary if the pistons 1 and 2 were of the same area.

A new condititon of equilibrium soon arises and this depends upon the extent to which the abutment 11 has been moved downwards. As this new condition of equilibrium is reached, the pistons 1, 2 are forced upwards while the spring 10 is compressed so that leakage through the port 9 again takes place and the piston 2 takes up a position such that the amount of fluid passing through the grooves 17 corresponds to the leakage. Therefore, the result of moving the abutment 11 downwards is that both springs 10 and 16 are more compressed than previously. It will be appreciated that the position of the rod 15 bears an exact relation to the position of the abutment 11 so that precise movements of the abutment 11, which can be effected with very little effort, bring about equally precise movements of the rod 15.

The grooves 17 on the lower piston provide, as is apparent from Figure 1, ports extending along the curved surface of the piston 2 from its upper surface to points a little distance above its lower surface so that the ports are covered by the cylinder when the piston member 1, 2 is in an upper position.

When the piston member 1, 2 is moved downwards, as described above, the conical bleeder port 9 is closed by the conical end of the stem 6 so that pressure builds up rapidly in the pipe line 8. Then, when the piston member 1, 2, moves upwards, a small annular space, as shown in Figure 1, appears between the two conical surfaces so as to permit fluid to escape in the event of the pressure tending to rise further as a result of leakage past the lower piston 2 from the space 4. To reduce the pressure in the pipe 8 so as to enable the spring 16 to push the piston 14 to a new position, the adjustable abutment 11 is allowed to rise. The effect of this is to allow the piston member 1, 2 to rise somewhat to cause the grooves 17 to cut off supply of fluid under pressure to pipe 8 while the excess pressure in the pipe 8 is relieved by the escape of fluid through the bleeder port 9. Fluid escaping from this port enters a space 18 in communication through a pipe 19 with waste or with the inlet of a pump for maintaining pressure in the pipe 12. The means for controlling the position of the abutment 11 may consist of a pivoted cam which bears on a follower 21 constituted by a stem extending upwards from the adjustable abutment 11. Such a pivoted cam is described below in relation to Figure 4.

Figure 2:
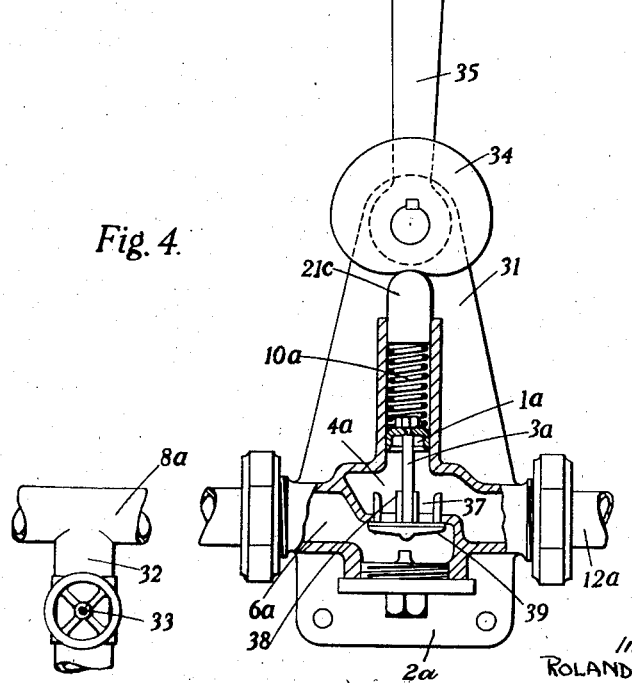
Figure 2 shows part of a further form of remote control apparatus.
Figure 3:
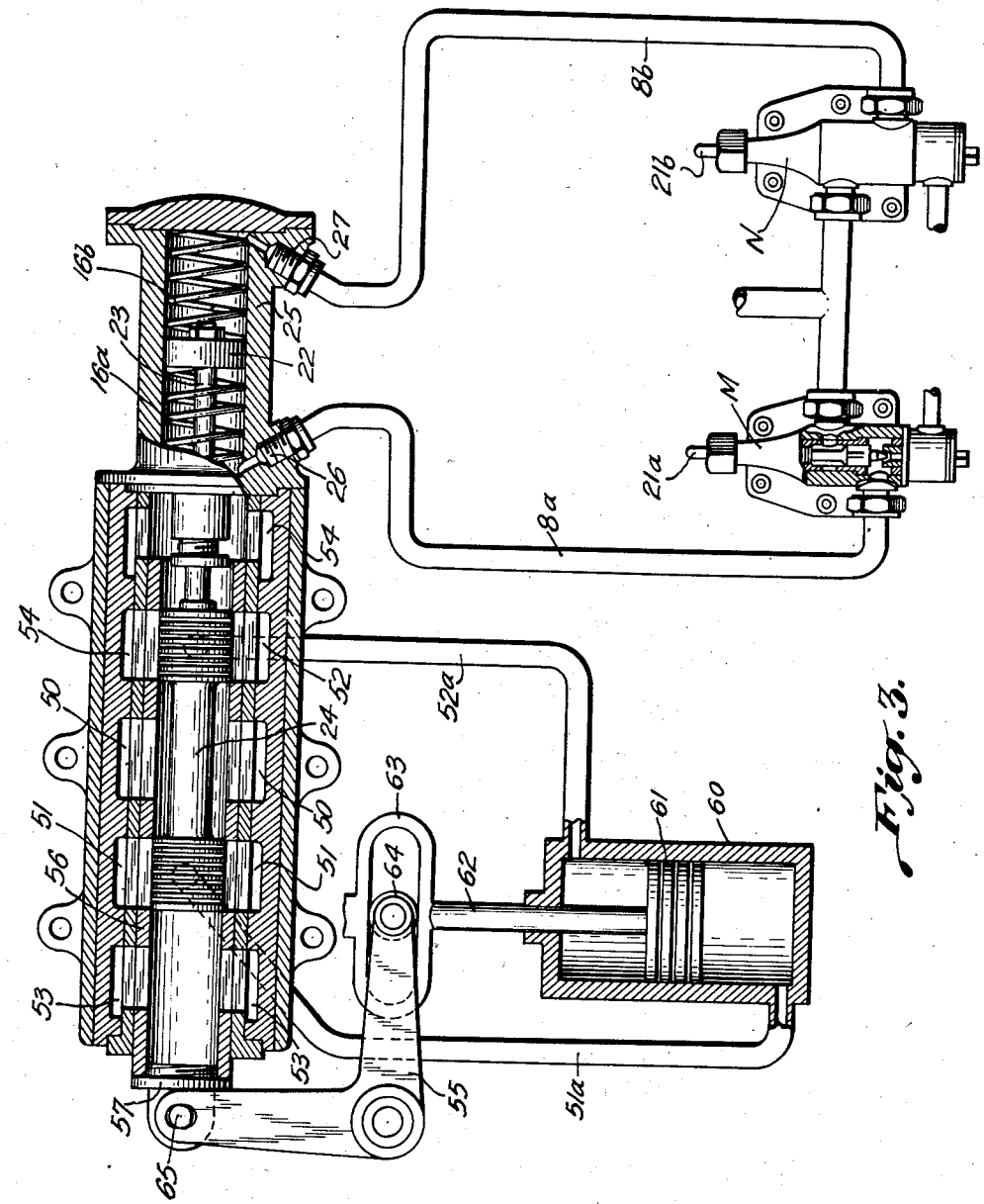
Figure 3 is a cross section of another part of the apparatus shown in Figure 2.

Instead of employing a single-acting piston loaded by a spring for the operation of the remote apparatus, a double-acting piston and cylinder arrangement, as shown in Figure 3, may be employed. In this arrangement the double-acting piston 22 is connected by a piston rod 23 to the piston element 24 in a servo control for a ship's steering gear. The piston 22 is mounted to reciprocate in a cylinder 25 in communication respectively at each end through ports 26 and 27 and pipes 8a and 8b with two controlling devices M and N such as that shown on the right-hand side of Figure 1. The stems 21a and 21b projecting upwards from the adjustable abutments in these two controlling devices appear also in Figure 2. A two-armed lever 30a, pivoted at its mid-point, bears respectively at its ends on the stems 21a and 21b. The lever 27 can be swung about its axis by a wheel 28 connected to the lever through the medium of a gear segment 30. Thus, each time the steering wheel 28 is turned, the result is that one of the stems 21a and 21b is depressed while the other is allowed to rise a corresponding amount. Accordingly, the pressure on one side of the piston 22 is reduced while the pressure on the other side is increased and the steering gear is actuated proportionately. To ensure that the steering gear shall not tend to move only to its extreme positions, springs 16a and 16b, serving the same function as the spring 16, are mounted one on each side of the piston 22 and are such that they are just unstressed when the piston is at the centre of its stroke. Therefore, an increase in pressure on one side of the piston 22 results in movement of the piston until the pressure due to the spring on the other side provides a balancing force.

Movement towards the right of the servo piston element 24, which constitutes a piston valve, from its mid position (in which position it is shown in Figure 3) serves to admit fluid under pressure from central ports 50 to ports 52 and pipe 52a to one end of a servo cylinder 60. This causes a piston 61 to move towards the other end of the cylinder 60 for the purpose of operating the ship's steering gear through the medium of a piston rod 62. So that the piston 61 shall only move a distance corresponding to the movement of the piston 22, a follow-up device is provided to cut off the admission of pressure fluid to the cylinder 60, the time at which the follow-up device becomes effective depending on the distance through which the piston element 24 is moved to the right. This follow-up device comprises a sleeve 56 formed to cut-off the connection between the ports 50 and 52 when the sleeve 56 is moved to the right through the medium of a bell-crank lever 55 which is swung in a clockwise direction by a slotted port 63 of the piston rod 62 acting on a roller 64 on the bell-crank lever. The latter is connected to the sleeve 56 through a pin and slot connection 65 with a member 57 screwed into one end of the sleeve 56. Exhaust from the remote end of the cylinder 60 takes place through a pipe 51a, ports 51, and exhaust ports 53.

When the piston valve 24 is moved to the left, pressure fluid passes from the ports 50, the ports 51 and pipe 51a to the remote end of the cylinder 60 while exhaust takes place through pipe 52a, ports 52 and exhaust ports 54. This continues until the sleeve 56 cuts off communication between ports 50 and 51 on the one hand and ports 52 and 54 on the other hand.

This servo mechanism is of a kind known in the art and the above description is believed to be sufficient for those skilled in the art. The novelty of the apparatus lies in the controlling devices M and N (described above with reference to Figure 1) acting in conjunction with piston 22.

In the modified arrangement shown in Figure 4, a piston and cylinder arrangement (not shown), similar to the piston and cylinder assembly 13, 14 in Figure 1, is controlled by valve mechanism similar to that appearing in Figure 1 in that it comprises differential pistons 1a and 2a connected by a co-axial rod 3a. The valve mechanism appearing in Figure 4, however, differs from that in Figure 1 chiefly in that the small discharge valve 6, 9 is omitted and a discharge duct 32 leads from the pipe 8a, in which the fluid pressure is controlled, to waste or to a reservoir from which fluid under pressure is delivered to the controlling valve through the inlet pipe 12a. This duct is a substitute for the port 9 in Figure 1, but it is not automatically opened and closed during the operation of the apparatus. The duct 32 contains a valve 33 which may be operated at will to adjust the rate at which fluid can leak from the pipe 8a. Normally, the valve 33 is adjusted so that the fluid leaks quite slowly from the pipe 8a.

In the arrangement of Figure 4, when it is desired to increase the pressure in the pipe 8a so as to move the controlled piston against the spring which loads it, a cam 34 is turned by means of a handle 35 so as to press down a stem 21c providing an abutment for a spring 10a. The piston assembly 1a, 2a, is, therefore, moved downwards so as to increase the rate at which fluid passes through slots 37 in a skirt 38 projecting upwards from the crown 39 of the piston 2a. Thus pressure builds up in the pipe 8a and this returns the pistons to positions in which the fluid is delivered to the pipe 8a at the same rate as it leaks through the duct 32. The spring 10a is now more highly stressed than it was before the pressure in the pipe 8a was increased. When it is desired positively to reduce the pressure in the pipe 8a, the cam is turned so as to reduce the stress in the spring 10a with the result that fluid is allowed to leak from the pipe 8a until a new state of equilibrium is attained.

It has been proved in practice that the movements of the controlled piston are always exactly proportionate to the movement of the controlling valve, and in one experiment a magnification of movement of 50 to 1 has actually been obtained.

It is to be understood that the additional loading means for the pistons 1, 2 or 1a, 2a need not be as shown in Figures 1 and 4 but the spring 10 or 10a may be replaced, for example, by fluid pressure applied to one side of a diaphragm acting at its other side on the pistons.

I claim:

1. Remote control apparatus comprising, in combination, a reciprocable piston, a second reciprocable piston connected to but spaced from and of smaller area than the said first mentioned piston, means responsive to fluid under pressure, a conduit, interposed between said pressure-responsive means and the side of said first-mentioned piston remote from said second piston, for containing a column of fluid under pressure, means for admitting fluid under pressure to the space between said two pistons to provide a resultant thrust, on the assembly comprising said pistons, in a direction to oppose the thrust on the assembly by pressure in said conduit, and adjustable means for loading said assembly to assist said resultant thrust, whereby the pressure in said conduit may be varied by adjusting said adjustable loading means, said conduit being formed with a leakage port and said first-mentioned piston being formed with a passage for the admission of fluid from said space to said conduit in an amount equal to the leakage through said leakage port when said pistons are in equilibrium condition.

2. Remote control apparatus comprising, in combination, a piston assembly including two pistons of different areas fixed together with a space between them, means responsive to fluid under pressure, a conduit for containing a column of fluid under pressure interposed between said pressure-responsive means and the face of the larger of said two pistons remote from the smaller of said pistons, the larger of said pistons being formed with passages to provide communication between the space between said pistons and said conduit when said assembly is in one position and to close said communication when said assembly is in another position, means for admitting fluid under pressure between said pistons to provide a resultant thrust on said assembly in a direction such as to oppose the thrust on the assembly by pressure in said conduit, and adjustable loading means applied to said assembly to assist said resultant thrust in balancing pressure in said conduit, whereby an increase in the load due to said adjustable loading means serves to cause said passages to enlarge communication between said space and said conduit to increase the pressure in the latter, said conduit being formed with a leakage port to allow leakage from said conduit in an amount equal to the amount admitted to said conduit through said passages when said pistons are in equilibrium condition.

3. Remote control apparatus comprising, in combination, a reciprocable piston, a second reciprocable piston connected to but spaced from and of smaller area than said first-mentioned piston, means responsive to fluid under pressure, a conduit, interposed between said pressure-responsive means and the side of said first-mentioned piston remote from said second-mentioned piston, for containing a column of fluid under pressure, a spring adapted to act on said smaller piston to exert a force tending to oppose the force of the pressure of said column of fluid on said first-mentioned piston, means for admitting pressure between said two pistons to provide a further force opposing the force of said column of fluid under pressure, and means for admitting fluid under pressure from the space between said pistons to said conduit under control of said first mentioned piston, said conduit being formed with a leakage port for the discharge of fluid so that said pistons take an equilibrium position, except when the stress in said spring is being varied, in which the amount of fluid passing said leakage port is equal to the amount of fluid entering said conduit.

4. Remote control apparatus comprising, in combination, an assembly comprising a small piston and a larger piston secured together with a space between them and a valve member secured to the side of said larger piston remote from said small piston, a casing formed with cylinders wherein said pistons are reciprocable and with a discharge port adapted to be closed by said valve member, said casing being further formed with an inlet port adapted to deliver fluid under pressure to said space between said two pistons and with an outlet port, pressure-responsive means, a conduit interconnecting said outlet port and said pressure-responsive means, and adjustable means for loading said assembly, at least one member in the combination comprising said assembly and said casing being formed with transfer passages adapted to be opened and closed according to the position of said assembly in said casing and to transfer fluid under pressure from said space to said outlet port, and the arrangement being such that, when said loading means are adjusted to reduce the load exerted thereby on said assembly, the latter moves under the thrust thereon exerted by the fluid under pressure in said conduit so as to open said discharge port and close said transfer passages but that, when said loading means are adjusted to increase said load, said assembly moves under the combined thrust of said load and the resultant load on said pistons due to the fluid in said space so as to close said discharge port and open said transfer passages, while, when said loading means have been adjusted, said assembly takes an intermediate position in which the amount of fluid passing said transfer passages is equal to the amount of fluid passing said discharge port.

5. Remote control apparatus comprising, in combination, a casing formed with first and second spaces for fluid under pressure and with a passage between same, a reciprocable piston arranged to be subjected on one side to pressure obtaining in said first space and on the other side to pressure obtaining in said second space, said piston being adapted so to co-operate with said casing that, in one position of said piston relatively to said casing, fluid is admitted from said first space to said second space and in a second position of said piston fluid is prevented from passing between said two spaces, a second piston of smaller area than said first piston and fixed thereto, said second piston being arranged to be subjected to pressure obtaining in said first space and thereby to tend to urge said first piston to said second position, loading means applied to the assembly including said two pistons tending to urge said first piston to said first-mentioned position, pressure-responsive means, a conduit connecting said second space with said pressure-responsive means, and means adapted to permit fluid to leak slowly from said conduit, whereby said pistons take an equilibrium position in which the amount of fluid permitted to leak is equal to the amount of fluid entering said second space.

6. Remote control apparatus comprising, in combination, a casing formed with first and second spaces for fluid under pressure and with a passage between same, a reciprocable piston arranged to be subjected on one side to pressure obtaining in said first space and on the other side to pressure obtaining in said second space, said piston being adapted so as to co-operate with said casing that, in one position of said piston relatively to said casing, fluid is admitted from said first space to said second space and in a second position of said piston fluid is prevented from passing between said two spaces, a second piston of smaller area than said first piston and fixed thereto, said second piston being arranged to be subjected to pressure obtaining in said first space and thereby tend to urge said first piston to said second position, loading means applied to the assembly including said two pistons tending to urge said first piston to said first-mentioned position, pressure responsive means including a cylinder, a controlled piston mounted to reciprocate in said cylinder, and a spring mounted to exert pressure on one side of said piston, a conduit connecting said second space and the interior of said cylinder on the side of said controlled piston remote from said spring and means adapted to permit fluid to leak slowly from said conduit, whereby said first mentioned piston is caused, except when said loading means are being adjusted, to take up an intermediate position, between said first and second positions, in which fluid enters said second space in a lesser amount than when said piston is in said first position and in an amount equal to the amount of fluid permitted to leak from said conduit.

7. Remote control apparatus comprising, in combination, a cylinder, a controlled piston mounted to reciprocate in said cylinder, two springs mounted respectively to act on the faces of said controlled piston to resist movement of said piston towards the ends of said cylinder, two means for adjusting the pressure in a conduit, two conduits respectively connecting said two means with the ends of said cylinder, each of said means comprising a reciprocable controlling piston, a second reciprocable controlling piston connected to, but spaced from and of smaller area than, the said first-mentioned controlling piston, means for admitting fluid under pressure to the space between said two controlling pistons to provide a resultant thrust on the assembly comprising the pistons in a direction to oppose the thrust on said assembly by the pressure in the one of the two conduits associated with said adjusting means, the latter comprising also adjustable means for loading said assembly to assist said resultant thrust, whereby the pressure in the said one of the two conduits may be varied by adjusting said adjustable loading means, the said conduit being formed with a leakage port, and said first-mentioned controlling piston being formed with a passage for the emission of fluid from said space to said conduit in an amount equal to the leakage through said leakage port when said controlling pistons are in equilibrium condition.

8. Remote control apparatus comprising, in combination, a cylinder, a controlled piston mounted to reciprocate in said cylinder, springs mounted respectively to act on the faces of said controlled piston to resist movement of said piston to the ends of said cylinder, two means for adjusting the pressure in a conduit, two conduits respectively connecting said two means with the ends of said cylinder, each of said two means comprising, in combination, an assembly including two opposed pistons spaced apart and of different areas and a valve member secured to the face of the larger of said opposed pistons remote from the smaller, a casing formed with cylinders wherein said opposed pistons are reciprocable and with a discharge port adapted to be closed by said valve member, said casing being further formed with an inlet port adapted to deliver fluid under pressure to the space between the said two opposed pistons and with an outlet port receiving one end of the associated conduit, adjustable means for loading said assembly, at least one member in the combination comprising said assembly and said casing being formed with transfer passages adapted to be opened and closed according to the position of said assembly in said casing and to transfer fluid under pressure from said space to said outlet port, and the arrangement being such that, when said loading means are adjusted to reduce the load exerted thereby on said assembly, the latter moves under fluid pressure to open said discharge port and close said transfer passages but that, when said loading means are adjusted to increase said load, said assembly moves to close said discharge port and open said transfer passages, while, when said loading means have been adjusted, said assembly takes an intermediate position in which the amount of fluid passing said transfer passages is equal to the amount of fluid passing said discharge port.

ROLAND BENNETT.